US008678332B2

(12) United States Patent
Benthien et al.

(10) Patent No.: US 8,678,332 B2
(45) Date of Patent: Mar. 25, 2014

(54) ADHESIVE HOLDER FOR HOLDING OBJECTS AND KIT

(75) Inventors: Hermann Benthien, Sottrum (DE); Sheriff Shehata, Bremen (DE)

(73) Assignee: Airbus Operations GmbH (DE)

( * ) Notice: Subject to any disclaimer, the term of this patent is extended or adjusted under 35 U.S.C. 154(b) by 182 days.

(21) Appl. No.: 13/181,021

(22) Filed: Jul. 12, 2011

(65) Prior Publication Data
US 2012/0006236 A1    Jan. 12, 2012

Related U.S. Application Data

(60) Provisional application No. 61/363,389, filed on Jul. 12, 2010.

(30) Foreign Application Priority Data

Jul. 12, 2010 (DE) .................. 10 2010 026 877

(51) Int. Cl.
    A45D 42/14    (2006.01)
    F16B 47/00    (2006.01)

(52) U.S. Cl.
    USPC ................ 248/205.3; 248/228.1; 248/228.5; 248/231.61; 248/316.7

(58) Field of Classification Search
    CPC ............................. F16B 5/0233; H02G 3/32
    USPC ........ 248/205.3, 205.4, 228.1, 228.5, 231.61, 248/231.85, 316.1, 316.7
    See application file for complete search history.

(56) References Cited

U.S. PATENT DOCUMENTS

| 5,740,994 | A | 4/1998 | Laughlin |
| 5,833,180 | A * | 11/1998 | Baranowski ................ 248/118 |
| 7,191,990 | B2 * | 3/2007 | Hutter, III ................ 248/229.12 |
| 7,391,624 | B2 * | 6/2008 | Hutter, III ................ 361/810 |
| 2009/0283649 | A1 * | 11/2009 | Wood et al. ................ 248/205.3 |

* cited by examiner

Primary Examiner — Anita M King
(74) Attorney, Agent, or Firm — Lerner, David, Littenberg, Krumholz & Mentlik, LLP

(57) ABSTRACT

An adhesive holder for holding objects comprises an adhesive layer, an object holder, an adapter with a contact surface and a counter element with a counter surface. The counter surface of the counter element is positionable at a distance from the contact surface of the adapter in order to enclose a section of a structural element. The adhesive layer can be applied onto the contact surface of the adapter or onto the counter surface of the counter element. The adhesive holder according to the invention makes it possible to introduce a force into a structural element by exerting compressive stress and shearing stress only such that the adhesive connection is much more durable and the adhesive holder can be subjected to higher loads than in the state of the art.

17 Claims, 17 Drawing Sheets

ADHESIVE HOLDER FOR HOLDING OBJECTS AND KIT

CROSS-REFERENCE TO RELATED APPLICATIONS

This application claims the benefit of the filing date of U.S. Provisional Patent Application No. 61/363,389 filed on Jul. 12, 2010, the disclosure of which is hereby incorporated herein by reference.

BACKGROUND OF THE INVENTION

The invention pertains to an adhesive holder for holding objects, a kit and a method for making an adhesive holder for holding objects.

In many larger and technically complex systems such as, for example, in vehicles and particularly in aircraft, a plurality of cables and lines are frequently installed and held on a structure in predefined positions. This requires suitable holders that encompass and hold the respective cables or lines relative to the structure. In order to achieve an adequate holding force and therefore a high reliability, such holders are predominantly fixed on the structure mechanically by means of a screw or rivet joint that involves weakening of the structure due to the required bore. This is particularly undesirable in vehicles.

There also exist alternative holders that are fixed, for example, on a structure of a vehicle such as on a skin panel or on reinforcing components by means of an adhesive connection. However, it may occur that the holder separates from the structure due to vibrations during the operation of the vehicle in connection with the inert mass of the held cables and lines. As soon as the adhesive surface of the adhesive connection separates on one side, a peeling stress develops in the adhesive surface and leads to an accelerated complete separation of the holder. The shearing stress on an adhesive surface may be much higher than the allowed peeling stress and amounts, for example, to 20-times the permissible peeling stress. Generally speaking, such a peeling stress on adhesive surfaces should therefore be avoided.

In adhesive holders of this type, the holding force and therefore the reliability of the holder are dependent on the size, the thickness and the orientation of the adhesive layer, as well as on the intensity and the direction of the force acting upon the adhesive holder, such that the dimensioning and orientation of this adhesive layer are the determining factors with respect to the dimensioning of the adhesive holder. If an adhesive holder is applied onto a structure of the vehicle, it also needs to be taken into account that the structure usually comprises protective paint that tolerates less shearing stress or tensile stress than the actual adhesive layer.

DE 41 03 237 C1 and U.S. Pat. No. 5,388,790 A show a guide frame (also referred to as "peek traverse") for lines in an aircraft with individual tubes that are connected to one another at predetermined locations, wherein the free ends of the tubes may be connected to the structure of the aircraft. The guide frame consists of tubular elements and molded connecting parts, wherein the molded connecting parts comprise connecting pins that are bonded into the tubular elements and provided with wedge-shaped pockets on their outer cylindrical surfaces.

BRIEF SUMMARY OF THE INVENTION

It is the object of the invention to reduce or entirely eliminate the above-described disadvantages. It is the particular object of the invention to propose a holder for holding objects that not only may be subjected to high loads, but also easily and inexpensively manufactured and reliably fixed on a structure such as, for example, a vehicle.

This object is met by a holder, which may also be called an adhesive holder, as it encompasses at least a portion of an adhesive layer, with the characteristics of independent claim 1. Advantageous additional developments are disclosed in the dependent claims.

According to a first aspect of the invention, the adhesive holder comprises an adhesive layer, an object holder, an adapter with a contact surface and a counter element with a counter surface, wherein the counter surface of the counter element is positionable at a distance from the contact surface of the adapter, and wherein the adhesive layer is in contact with the contact surface of the adapter and/or the counter surface of the counter element. The adapter and the counter element therefore form a gap with a clearance that is defined by the spacing between the contact surface and the counter surface, wherein this gap serves for encompassing and at the same time adhesively fixing a section of a structural element by means of the adhesive layer. In this case, the corresponding structural element may be realized as, for example, a radial or axial stiffening component in the form of a frame or stringer of a fuselage structure of the vehicle, on which the adhesive holder according to the invention may be arranged. Due to the ability to enclose the structural element with a defined clearance, it is practically impossible for peeling stress to act upon the adhesive layer because a compressive load application always takes place in dependence on the rigidity. The risk of the adhesive layer separating from the adapter, the counter element or the structural element on one side therefore is eliminated.

The adhesive holder according to the invention produces a positive connection with the structural element such that, in particular, compressive forces originating from the object holder may be introduced into the structural element via the adapter and the counter element. In this case, the adhesive layer does not serve for the primary absorption of holding forces originating from the object holder, but rather for positioning the adhesive holder according to the invention at a predefined location and, in particular, for absorbing lateral motions due to vibrations or the like that do not extend in a primary direction of force defined by the object holder.

Due to the positive design of the connection between an adhesive holder according to the invention and a structural element, it is furthermore possible to apply significantly higher loads than in conventional adhesive holders, in which the dimensioning factor is the adhesive connection. This in turn means that the structure, on which the adhesive holder according to the invention is fixed, remains undamaged or is not impaired by screw or rivet bores and defines the durability and load bearing capacity of the adhesive holder according to the invention. Due to these positive properties, such adhesive holders are not limited to merely holding lines, cables and the like, but rather also suitable for fixing larger objects such as, for example, monuments or stowage compartments on a structure of a vehicle.

At this point, the different conceivable types of loads acting upon an adhesive layer of an adhesive holder are discussed in greater detail. Peeling stress develops when peeling off an adhesive layer bonded onto a substrate. Very high local peeling stress maxima occur at the location, at which the adhesive layer is still barely in contact with the substrate, wherein this represents a particularly unfavorable load for an adhesive connection. If possible, this type of load on an adhesive connection needs to be constructively precluded. Shearing or tangential stress develops due to slightly offset forces of identical intensity and parallel orientation that act in a direction tangential to the surface. In adhesive connections, an increasing tensile component develops as the axial load increases due to an adherent deformation. However, the shearing or tangential stress represents an almost ideal and preferred load type, particularly for rigid substrates, and is frequently used for designing adhesive surfaces. The tensile stress acts in a direction extending perpendicular to the substrate and represents a rather undesirable load type for adhesive connections. The adhesive holder according to the invention is almost exclusively subjected to compressive and shearing forces. The undesirable peeling and tensile loads are eliminated.

The object holder is preferably arranged at a location of the adhesive holder according to the invention that lies as close as possible to the structural element such that the adapter, the counter element or other components connected to the object holder only are slightly affected by bending moments.

In one preferred embodiment, the adapter is realized in the form of a plane component. In this case, the adapter may have a surface area with any geometric shape that may be chosen in dependence on the intended use. The surface area may be realized rectangular, square, polygonal, round, rounded, elliptical, U-shaped or the like. The utilization of oblong adapters is particularly advantageous due to the simple manufacture while U-shaped adapters make it possible to realize a larger adhesive surface.

The counter element may be designed in the same fashion. It is preferably also possible to use combinations of adapters and counter elements with different surface areas.

In a preferred embodiment of the invention, the adapter and the counter element are arranged parallel to one another such that, in particular, plane surfaces of a structural element may be accommodated between the adapter and the counter element.

In an advantageous embodiment of the invention, a plurality of adhesive layers are used, wherein it would be possible, for example, to arrange one adhesive layer on the contact surface of the adapter and another adhesive layer on the counter surface of the counter element. This makes it possible to increase the available adhesive surface without having to enlarge the installation space of the adhesive holder according to the invention.

At this point, it should be noted that the structural elements fitted with the adhesive holder according to the invention are frequently coated with protective paint, onto which the adhesive layer is applied. In this case, the shearing stress that may be absorbed by the adhesive holder according to the invention is not primarily defined by the adhesive layer, but rather the protective paint on the structural element that is in contact with the adhesive layer. This may be very easily taken into account by increasing the available adhesive surface due to the utilization of multiple adhesive layers.

In an advantageous embodiment, the adapter and the counter element are realized differently such that the counter surface of the counter element covers a region of the structural element that is not covered by the contact surface of the adapter. This is particularly advantageous if the stressed structure of the vehicle should regularly be optically inspected with respect to its integrity so as to ensure that any crack in the structural element may also be detected at a very short critical crack length, namely either from the side, on which the adapter is arranged, or from the side, on which the counter element is arranged. For example, the adapter may have a U-shape while the counter element is shaped in a rather oblong fashion. In the mounted state, the counter element would then extend into a region of the structural element that is not covered by the adapter on its other side. The design of the adapter and of the counter element naturally may also be inverted or otherwise realized in a differing or regionally inverted fashion.

In a preferred embodiment of the adhesive holder, an intermediate piece is additionally arranged between the adapter and the counter element in order to create a tolerance compensation and/or a predetermined spacing between the adapter and the counter element. This makes it possible to take into account any thicknesses of structural elements without having to modify the adhesive holder. For example, a spacer disk or a spacer sleeve represents a particularly simple design of an intermediate piece, wherein it would also be possible to utilize more complex cast, turned or milled parts.

In one preferred embodiment of the adhesive holder according to the invention, the intermediate piece may be composed of two or more intermediate piece sections that result in a predetermined thickness when they are variably arranged relative to one another.

In one particularly preferred embodiment, the intermediate piece comprises to wedge-shaped intermediate piece sections that may be arranged offset relative to one another in order to adjust a predetermined spacing between the structural element and the adapter or the counter element.

In one particularly preferred embodiment of the adhesive holder according to the invention, the adapter and the counter element comprise fastening devices that are adapted for fixing or for tensioning the adapter and the corresponding counter element relative to one another. One fastening device may be realized, for example, in the form of bores such that a threaded sleeve, an intermediate piece with threaded sections, an intermediate piece with a bore or a similar component may be inserted between the adapter and the counter element and a corresponding fastening component such as, e.g., a threaded element may be screwed into the component inserted between the adapter and the counter element from the side of the counter element and/or from the side of the adapter so as to produce a non-positive or positive connection between the adapter and the counter element.

It would alternatively or additionally also be possible to produce a bonded joint that holds the adapter and the counter element at a predetermined spacing from one another in the fastening devices and the fastening components so as to prevent permanent tensile, compressive and shearing stresses that result from the fastening of the adapter and the counter element only. This may be realized, for example, by bonding a threaded rod to counter nuts or other threaded elements such as, e.g., a threaded sleeve. The fastening of the adapter and the counter element therefore is force-free and non-distorted. The optional bonding of components may be utilized in all combinations of components and embodiments of the adhesive holder according to the invention.

In a particularly preferred embodiment of the adhesive holder according to the invention, the adhesive layer is realized in the form of a layer of an adhesive that has a predefined thickness and is designed for absorbing a compressive force. This may be realized, for example, in that the adhesive layer not only contains the adhesive, but also spacers such as one or more hard particles that serve for absorbing pressure and essentially are not or not noticeably deformed in a relevant range of the compressive force. It would be possible, for example, to utilize an adhesive layer, the adhesive of which contains a number of glass globules or other hard particles that also maintain the thickness of the adhesive layer under a compressive load. In this way, the adhesive holder according to the invention may be fixed on a structural element in a reliably solid fashion, wherein the adhesive holder is also protected against vibration-induced shifting and may be subjected to much higher loads than conventional adhesive holders that are merely bonded to a skin panel or the like of a vehicle fuselage.

A preferred embodiment is provided with a spacer, on which an object holder may be arranged. The spacer serves for positioning the objects to be held at a safe distance from the remaining components of the adhesive holder according to the invention so as to prevent their integrity from being impaired due to abrasion effects or the like. A spacer may be realized, e.g., in the form of a threaded sleeve that forms a usable adhesive holder together with a threaded rod, a counter nut, an intermediate piece, an adapter and a counter element.

In a preferred embodiment, an intermediate piece may comprise an eye for accommodating another component such as, for example, a spacer or an object holder. In another preferred embodiment, the adapter and/or the counter element likewise comprise an eye, on which another component may be arranged. In this case, the adapter and the counter element extend toward a side of the adhesive holder according to the invention that does not come in contact with the structural element.

A preferred embodiment furthermore comprises a holder for holding an insulating packet in a spaced-apart fashion. This holder may be realized in the form of a combination of a spacer and an object holder, wherein the insulating packet may lie on the structural element accommodating the adhesive holder according to the invention and be clamped against the spacer by the object holder. This would make the additional utilization of holding fixtures obsolete such that a weight reduction is achieved, particularly for the utilization in aircraft.

In order to absorb a force component that extends parallel to the adhesive layer, it may be advantageous to arrange several adhesive holders according to the invention on a structural element and to connect these adhesive holders by means of an adhesive or holding template. Such a template may be made of thin sheet metal and fix the individual adhesive holders according to the invention during the curing process of the adhesive. The template also remains on the adhesive holders after the curing process and at least partially absorbs the force components extending parallel to the adhesive layer. In still other embodiments, the adhesive holder of the invention includes additional structures for engaging at least one surface of the structural element to which the holder is to be adhered. These additional structures may further assist in maintenance of contact between the adhesive holder and the at least one surface of the structural element. These additional structures may include, without limitation, teeth, serrations, knurling, and texturing.

The object is furthermore met by a kit for making an adhesive holder according to the invention that comprises the above-described components. Any number and design of these components may be utilized for making an adhesive holder according to the invention for holding one or more objects and for connecting this adhesive holder to a structural element. In this case, the components may be selected from a group of components, wherein this group preferably comprises:
- adapters with any shapes,
- counter elements with any shapes,
- intermediate pieces for defining a spacing between an adapter and a counter element,
- spacers for positioning object holders in a spaced-apart fashion,
- fastening means for connecting adapters and counter elements, e.g., threaded elements such as screws, threaded rods and the like, rivet elements, adhesives and other means, in a spaced-apart fashion,
- object holders,
- adhesive layers, wherein the adhesive layer may consist of an adhesive and optional hard particles for absorbing compressive loads and limiting the thickness of the adhesive layer, and
- adhesive or holding templates.

The object is furthermore met by a method for making an adhesive holder for holding objects in a vehicle.

BRIEF DESCRIPTION OF THE DRAWING

Other characteristics, advantages and possible applications of the present invention result from the following description of the exemplary embodiments and the figures. In this case, all described and/or graphically illustrated characteristics also form the subject-matter of the invention individually and in any combination, namely regardless of their composition in the individual claims or their references to other claims. In the figures, identical or similar objects are furthermore identified by the same reference symbols.

DETAILED DESCRIPTION

Figure 1:
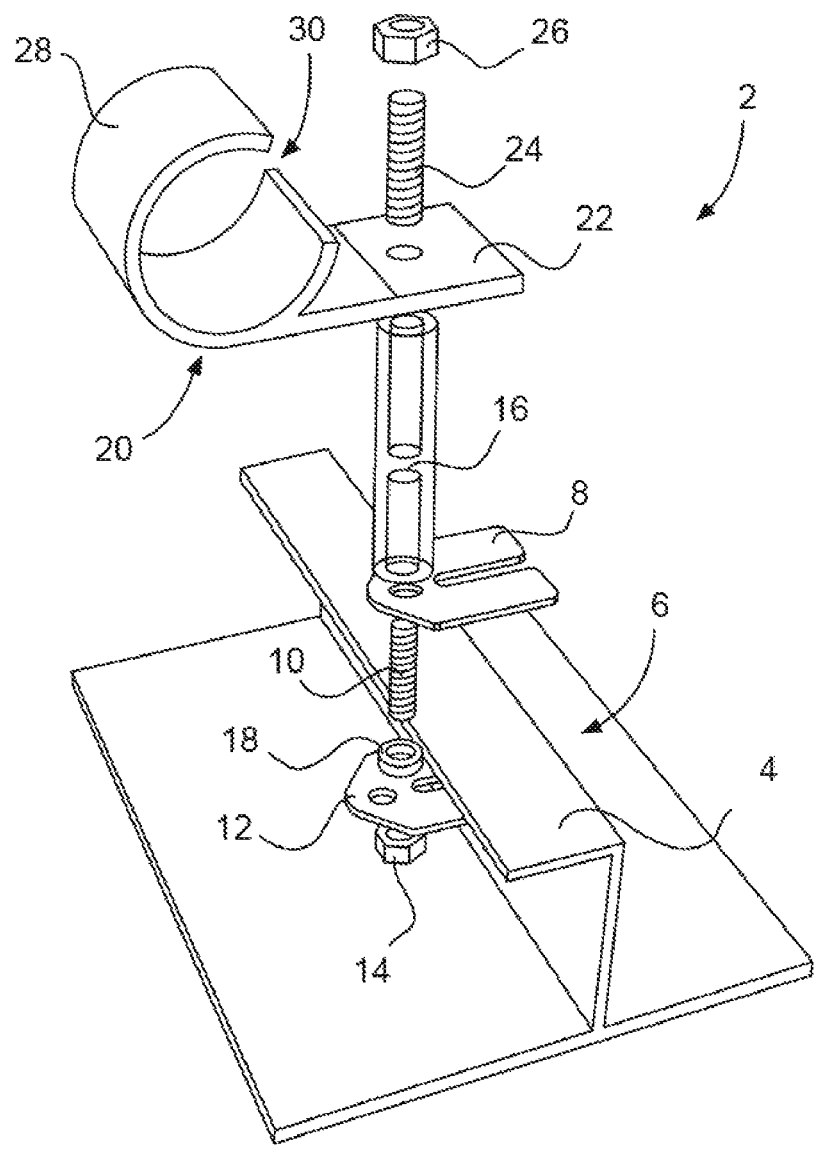
FIG. 1 shows an adhesive holder according to the invention in the form of an isometric view.

FIG. 1 shows an isometric view of an adhesive holder 2 according to the invention that is fastened to a base in the form of a web 4 of a structural element 6. In this case, an adapter 8 is clamped against the web 4 with a contact surface that faces the web 4 and a counter element 12 connected by means of a threaded rod 10 is clamped against the web with a counter surface that faces the web 4, wherein the threaded rod 10 acts upon the adapter 8 and the counter element 12, between which a spacer disc 18 is positioned, in a clamping fashion by means of a counter nut 14 and a threaded tube 16 that serves as a spacer. An object holder 20 that comprises a lug 22 is arranged on the opposite end of the threaded tube 16 referred to the adapter, wherein this object holder is arranged on the threaded tube 16 with the aid of said lug by means of another threaded rod 24 and a counter nut 26. In this illustration, the object holder 20 is realized in the form of a so-called P-clip that has a circular, interrupted clamp structure 28, into which cables or lines may be inserted and held therein. This P-clip preferably consists of a plastic material or a sheet metal part that may be elastically deformed and bent open in order to insert lines and cables, but clamps inserted lines with a certain force such that they cannot escape from the cutout 30 during vibrations or conventional lateral accelerations.

The peculiarity of the adhesive holder 2 according to the invention shown in this figure may be seen in that it is not necessary to weaken the structural element 6 with rivet bores or the like, wherein the adapter 8 and the matching counter element 12 rather enclose the structural element 6 in a forcipate fashion and a predefined bonding gap is formed by dimensioning the spacing between the adapter 8 and the counter element 12 with the aid of the spacer disc 18. An adhesive layer that is not shown in this illustration and preferably resistant to compressive stresses may be introduced into this bonding gap in order to hold the adhesive holder 2 according to the invention in its position along the web 4 of the structural element 6. As in any embodiment of the invention described herein, this may be done by application of the adhesive layer to the adapter and/or counter element. It may also be accomplished by application of the adhesive layer to the structural element directly.

When using an adhesive layer that is not compressed under the influence of compressive forces, a positive connection between the adhesive holder 2 according to the invention and the structural element 6 is produced without having to weaken the structural element 6. Consequently, objects may be connected to and held on the structural element 6 in a particularly rigid fashion, wherein no peeling stresses are developed and very high loads may be absorbed. The adhesive layer with a predetermined thickness may be realized with the aid of an adhesive that contains hard particles such as, e.g., glass globules or the like.

Figure 2:
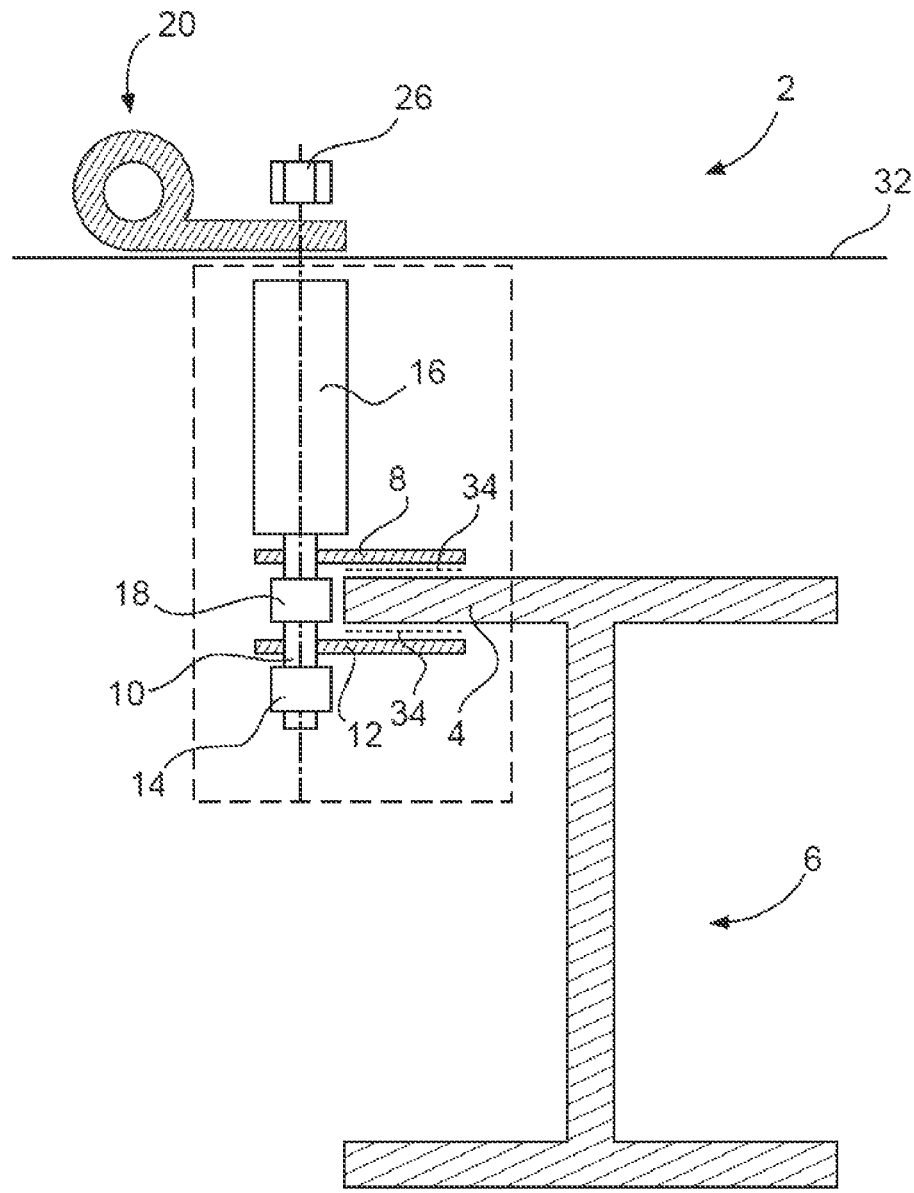
FIG. 2 shows an adhesive holder according to the invention with an object holder in the form of a lateral section.

FIG. 2 shows the adhesive layer 34 according to the invention in the form of a side view, wherein the dotted lines indicate the locations, at which an adhesive or an adhesive layer may be arranged. In this figure, the adhesive holder 2 is illustrated in a somewhat simplified fashion because the details are already illustrated with sufficient clarity in FIG. 1.

The peculiarity of the adhesive holder 2 according to FIG. 2 may be seen in that an insulating packet 32 may also be fastened on the reinforcing component 6 with the aid of the adhesive holder 2 according to the invention, for example, by being clamped between an object holder 20 and a threaded sleeve 16. In this way, the function of a fitting for fastening an insulating packet that is usually divided into two parts and holds the insulating packet 32 at a distance from the structure is fulfilled. The adhesive holder 2 according to the invention may furthermore comprise two adhesive layers 34 that are arranged between the web 4 and the adapter 8 and the counter element 12, respectively.

Figure 3:
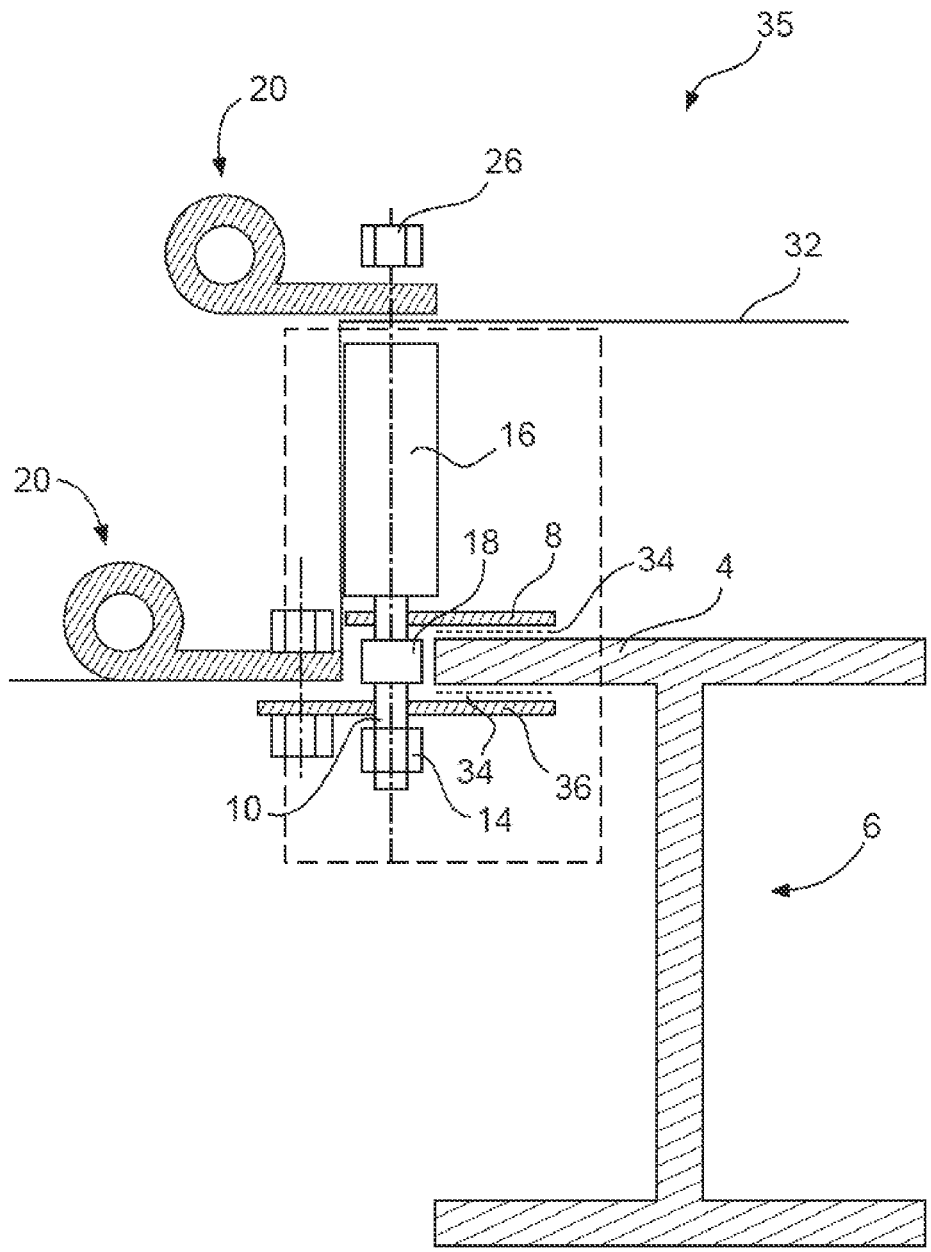
FIG. 3 shows an adhesive holder according to the invention with two object holders in the form of a lateral section.

FIG. 3 shows a variation of an adhesive holder 2 according to the invention according to FIGS. 1 and 2, in which a counter element 36 extends much farther from the web 4 of the structural element than in the preceding illustrations such that another object holder 20 may be arranged on the opposite side of the structural element 6 referred to the web 4. This illustration elucidates that an adhesive holder 35 according to the invention may be arbitrarily modified and expanded with a limited number of basic components in order to also manage more complex holding tasks.

Figure 4:
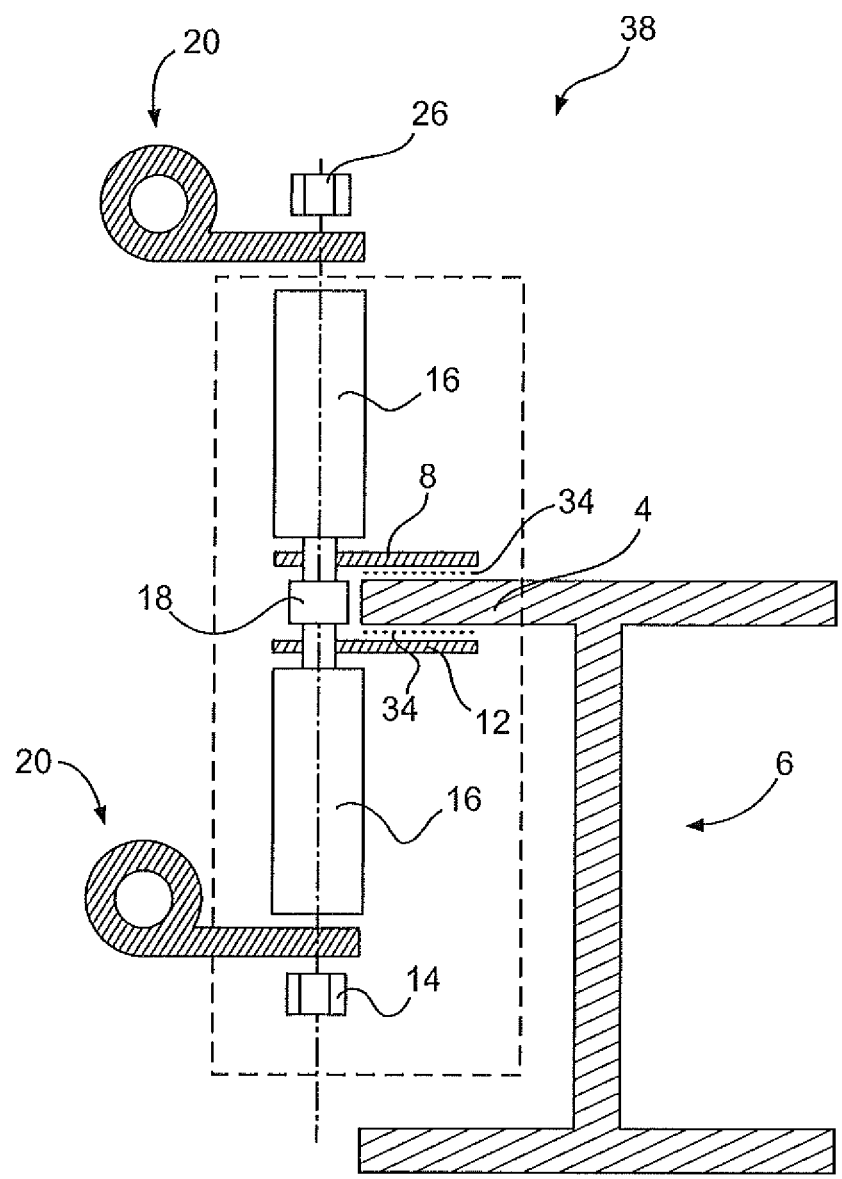
FIG. 4 shows an adhesive holder according to the invention with two object holders in the form of a lateral section.

FIG. 4 shows another variation of an adhesive holder 38 according to the invention that is essentially designed symmetrically referred to a web 4 of a structural element 6 and comprises two object holders 20 that are spaced apart from one another by a total of two threaded sleeves 16.

Figure 5:
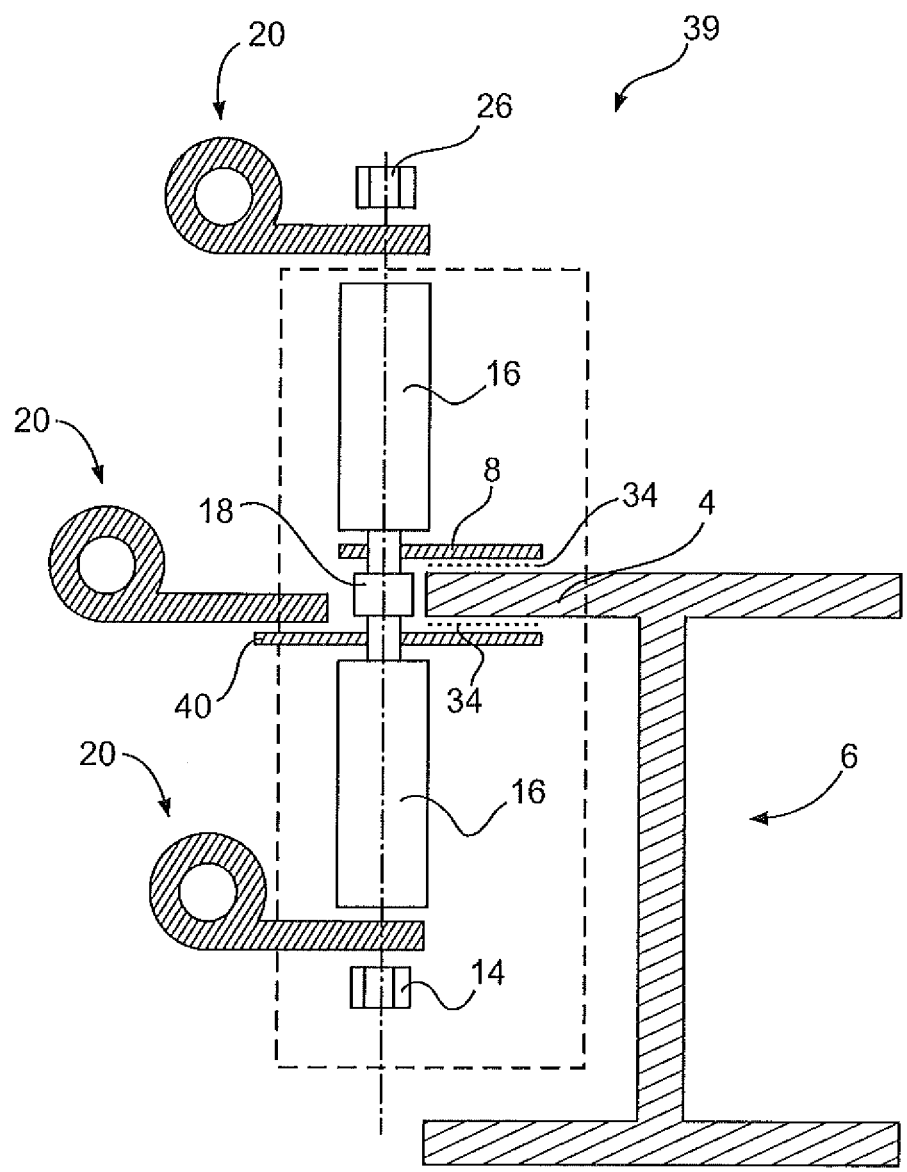
FIG. 5 shows an adhesive holder according to the invention with three object holders in the form of a lateral section.

A combination of the adhesive holders according to FIGS. 3 and 4 is illustrated in FIG. 5, in which an adhesive holder 39 according to the invention comprises a total of three object holders 20, wherein two object holders are arranged around two threaded sleeves 16 such that they are spaced apart from a counter element 40 that extends away from the web 4 and a third object holder is arranged on the opposite end of the counter element 40 referred to the web 4.

Figure 6:
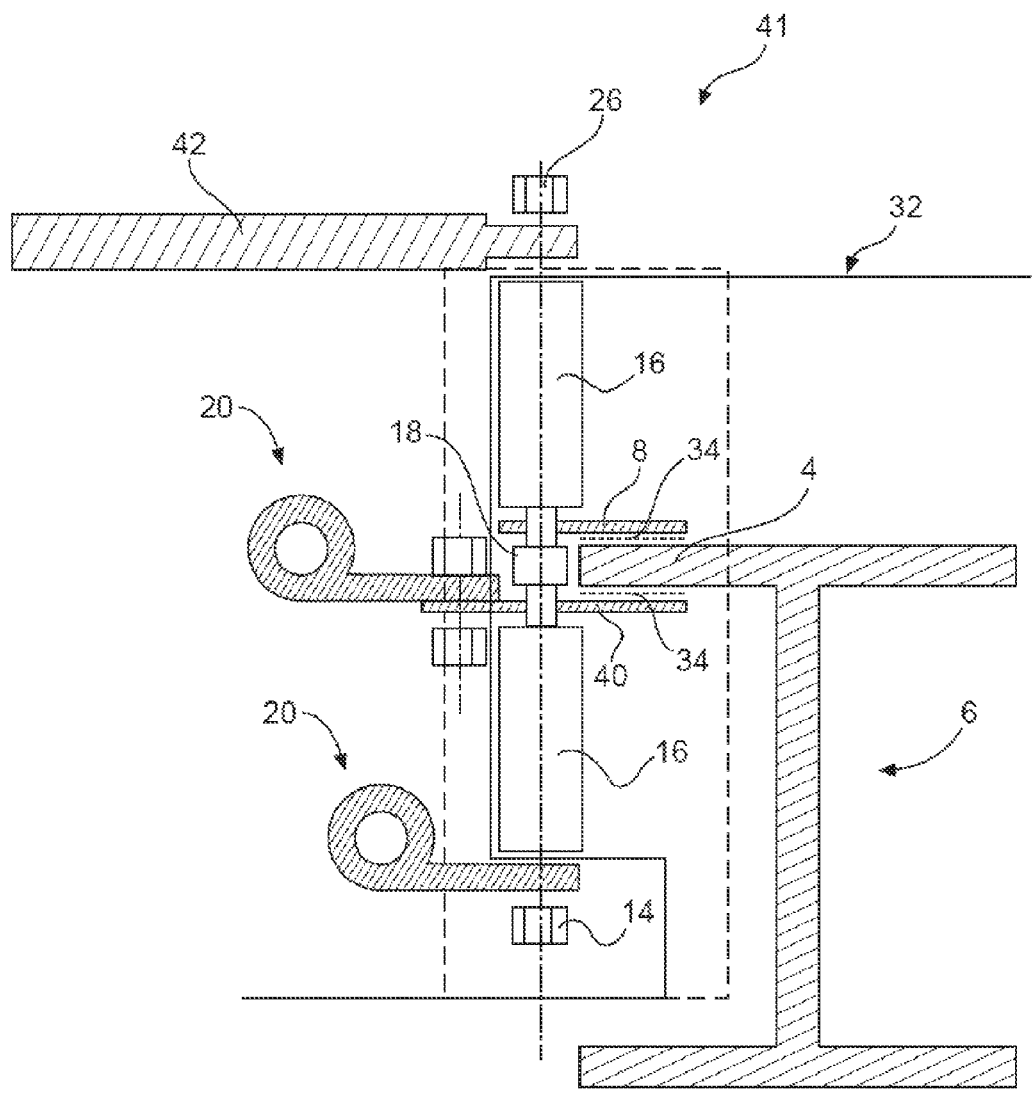
FIG. 6 shows an adhesive holder according to the invention with two object holders and a peek traverse in the form of a lateral section.

FIG. 6 shows another variation of an adhesive holder 41 according to the invention, on which a peek traverse is arranged on the opposite side referred to the structural element 6, an object holder 20 on a counter element 40 that is elongated in accordance with FIG. 5, namely in the region of the web 4 of the structural element 6, and another object holder 20 that faces the structural element. An insulating packet 32 may be fastened on this adhesive holder 41 such that dedicated fastening elements for an insulating packet may be eliminated in this region.

Figure 7:
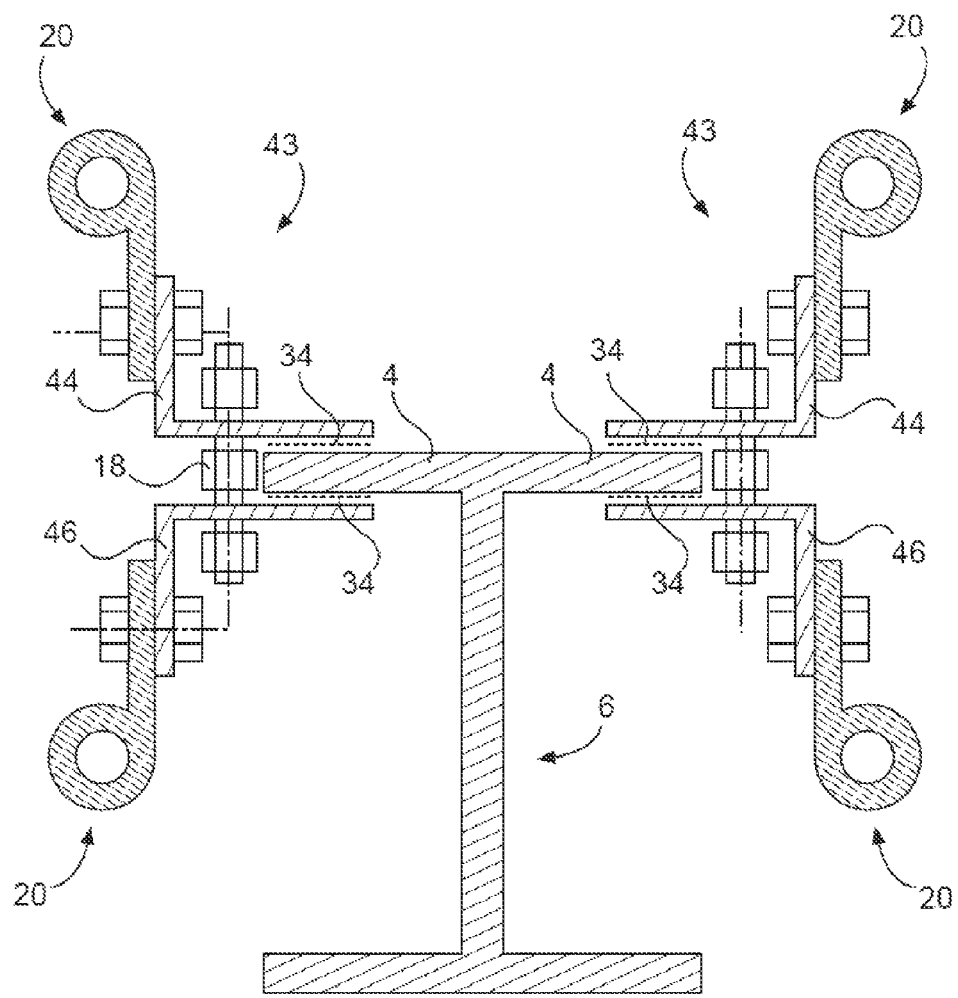
FIG. 7 shows an arrangement of two adhesive holders according to the invention with a total of four object holders.

FIG. 7 shows a structural element 6, on which a total of two adhesive holders 43 according to the invention that respectively comprise two object holders 20 are arranged. The peculiarity of this embodiment may be seen in that an adapter 44 and a counter element 46 are respectively realized orthogonally and arranged mirror-symmetrical to one another.

Figure 8:
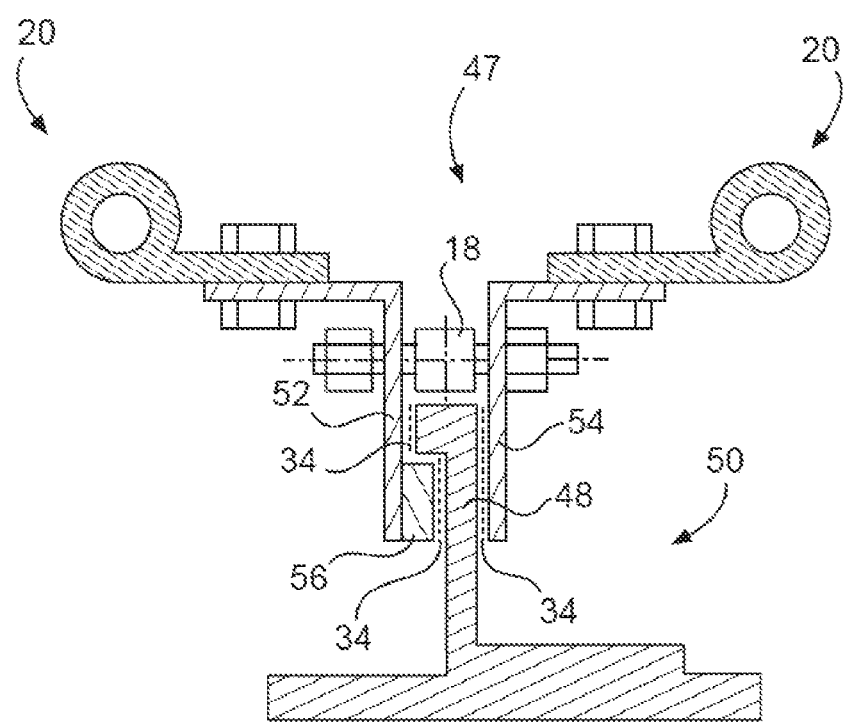
FIG. 8 shows an adhesive holder according to the invention with two object holders in the form of a lateral section.

All above-described exemplary embodiments of an adhesive holder according to the invention refer to the fastening on a structural element 6 in the form of a frame that has a T-shape or L-shape. Longitudinal reinforcing components 50, for example, of commercial aircraft fuselages which are also referred to as "stringers" do not have this T-shape such that the exemplary embodiment according to FIG. 8 shows a variation of an adhesive holder 47 according to the invention that is tailored to a web 48 of a stringer 50. An adapter 52 and a counter element 54 that respectively carry an object holder 20 may be shaped orthogonally and also arranged such that they are spaced apart from one another in this case, but the opposite side of the adapter 52 referred to the object holder 20 comprises an intermediate piece 56 that corresponds to the head shape of the web 48 of the stringer 50. During the fastening of the adapter 52 and the counter element 54, the stringer head is enclosed in a forcipate fashion between the adapter 52, the counter element 54 and the intermediate piece such that a reliable connection is produced. The intermediate piece 56 preferably is slightly thicker than necessary for enclosing the stringer head in a forcipate fashion such that no distortion occurs between the counter element 54 and the stringer head. An adhesive layer 34 may be respectively arranged between the counter element 54 and the web 48, between the adapter 52 and the web 48 and between the intermediate piece 56 and the web 48.

Figure 9:
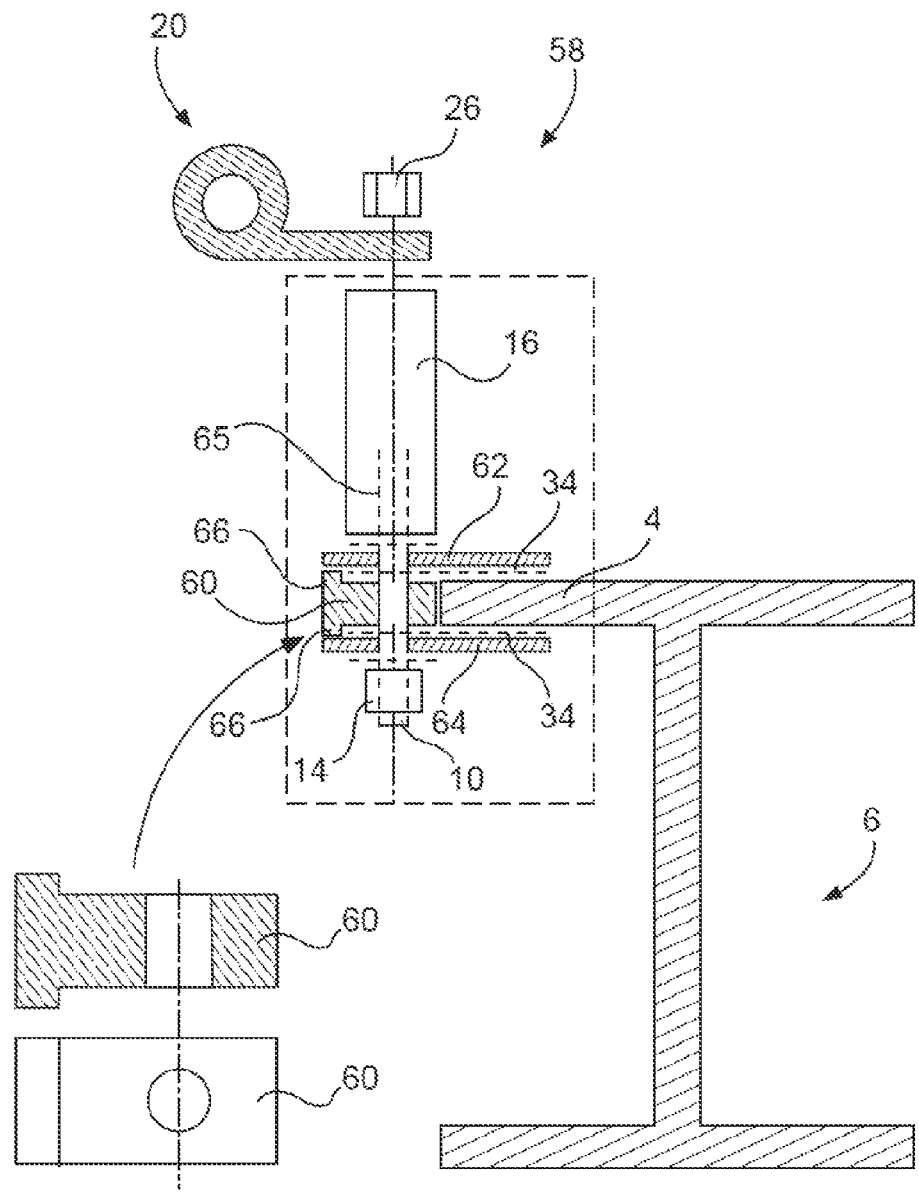
FIG. 9 shows an adhesive holder according to the invention with a spacer in the form of a lateral section.

FIG. 9 shows an adhesive holder 58 according to the invention, in which a spacer 60 is arranged between an adapter 62 and a counter element 64, wherein the opposite side of the spacer 60 referred to the structural element comprises shoulders 66 that are directed toward the adapter 62 and the counter element 64 and cause the adhesive holder 58 to be tensioned and fixed on the structural element 6. If the shoulders 66 are dimensioned accordingly, the opposite ends of the adapter 62 and the counter element 64 referred to the spacer 60 move father toward the web 4 of the structural element than the ends that are directed toward the spacer 60. As already described above, an alternative to the tensioning by means of a counter nut 14 consists of producing a bond with an adhesive 65 that holds the threaded rod 10, the counter nut 14 and the threaded sleeve 16 in a predetermined spatial arrangement. In this case, the adhesive 65 preferably is identical to the adhesive in the adhesive layer 34, but does not contain optional hard particles for realizing a constant thickness of the adhesive layer.

Figure 10:
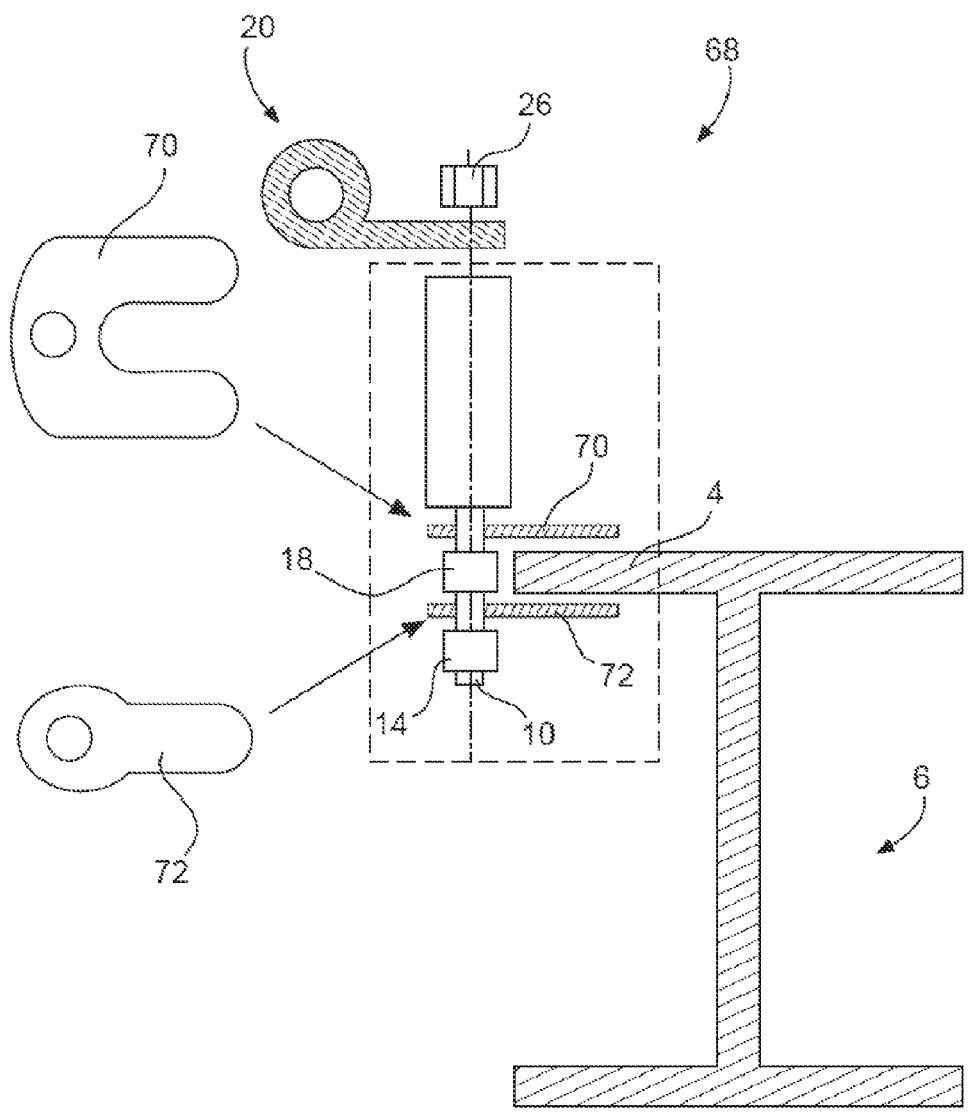
FIG. 10 shows an adhesive holder according to the invention with a non-overlapping adapter/counter element combination in the form of a lateral section.

When arranging adhesive holders on a structure, it also needs to be ensured that the structure may be subjected to a crack detection. Such a crack detection includes, for example, an optical inspection of a structure for cracks such that it should be ensured in all circumstances that occurring cracks may always be detected and are not covered. At a short critical crack length, it is advantageous to utilize an adhesive holder 68 according to the invention of the type illustrated in FIG. 10. This adhesive holder comprises an adapter 70 that is realized, for example, in a U-shaped fashion and comprises two U-limbs that are spaced apart from one another such that a visual inspection of the web of the structural element 6 may be carried out between the limbs of the adapter 70. The counter element 72, in contrast, has an essentially oblong shape that is situated underneath the adapter 70 in a region between the limbs of the adapter 70. Consequently, the entire surface of the web may be inspected for cracks from both sides of the web 4 of the frame 6 because the adapter 70 and the counter element 72 cover different regions of the web 4.

Figure 11:
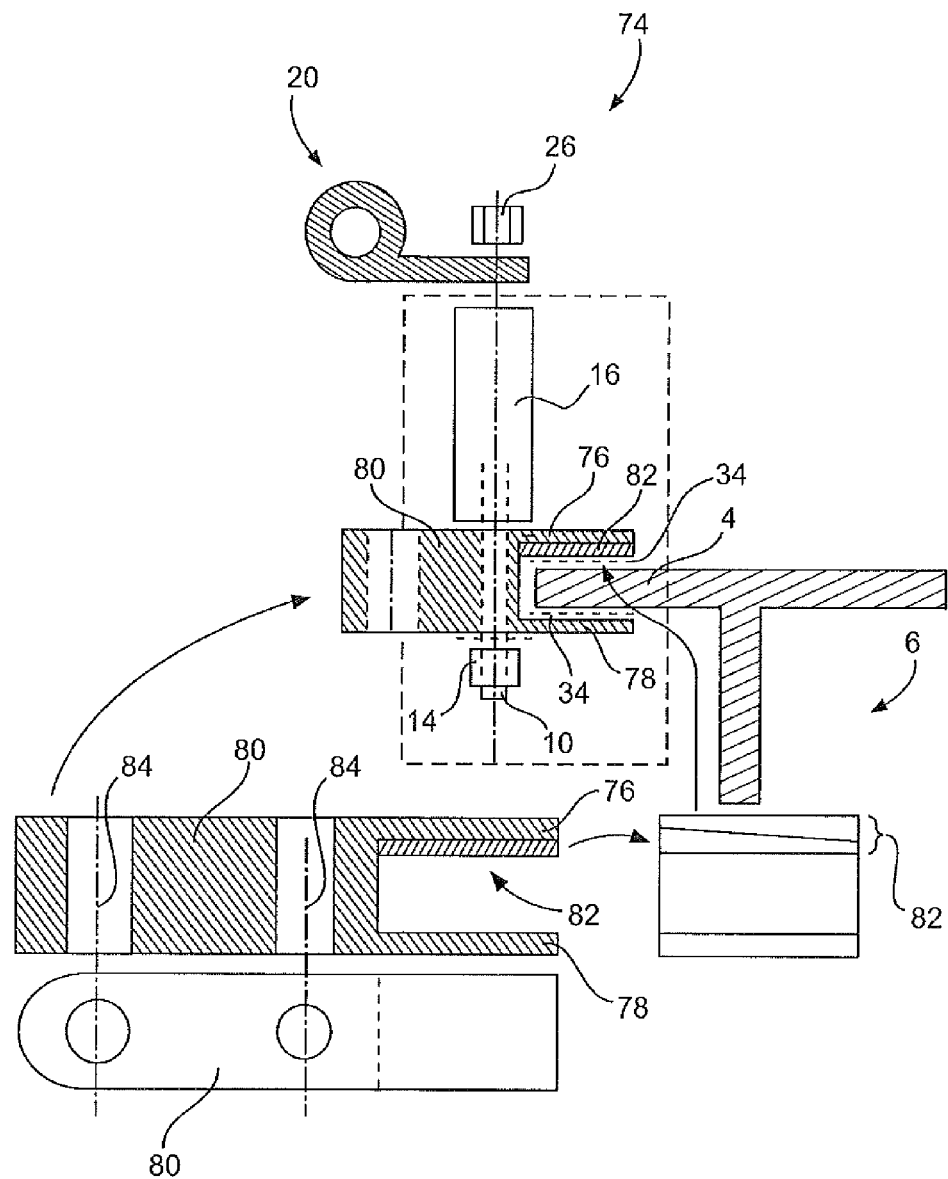
FIG. 11 shows an adhesive holder according to the invention with an integral milled part in the form of a lateral section.

In an adhesive holder 74 according to FIG. 11, an adapter 76 and a counter element 78 are combined in the form of an integral milled part 80, wherein the adapter 76 and the counter element 78 are realized in the form of lugs that are spaced apart from one another by a defined clearance. A combination of wedges 82 may be utilized for realizing an adaptation to individual thicknesses of a web 4 of a structural element, wherein a disk with a defined thickness may be produced by displacing the wedge surfaces relative to one another. The integral milled part 80 comprises two eyes 84 that serve for accommodating components of an adhesive holder such as, e.g., an object holder 20, a threaded sleeve 16 or the like.

Figure 12:
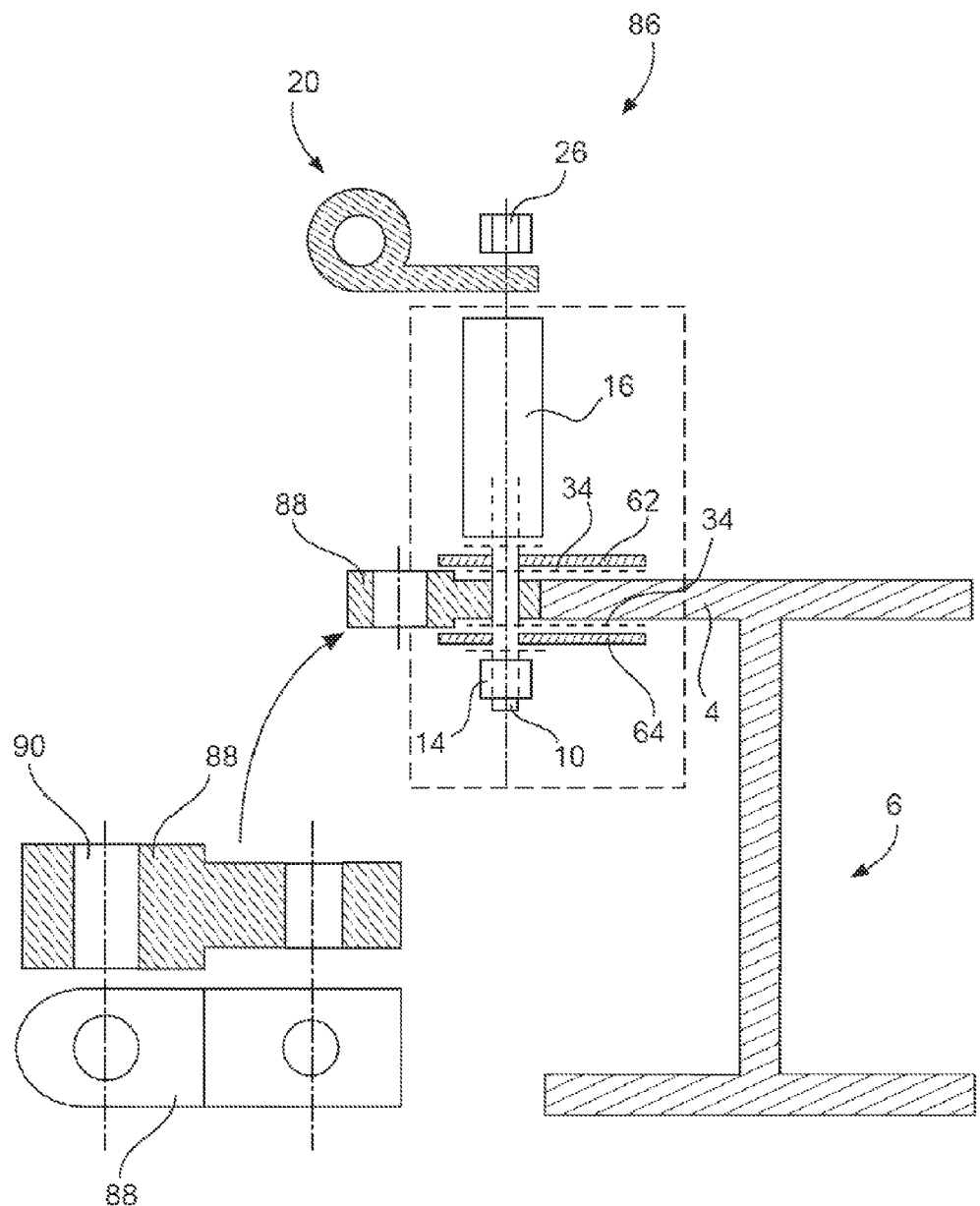
FIG. 12 shows an adhesive holder according to the invention with an elongated spacer in the form of a lateral section.

FIG. 12 shows a variation of the adhesive holder according to FIG. 9 in the form of an adhesive holder 86, in which a spacer 88 extends farther outward from the structural element 6 and comprises an eye 90 in order to accommodate, for example, another object holder 20 at this location.

Figure 13:
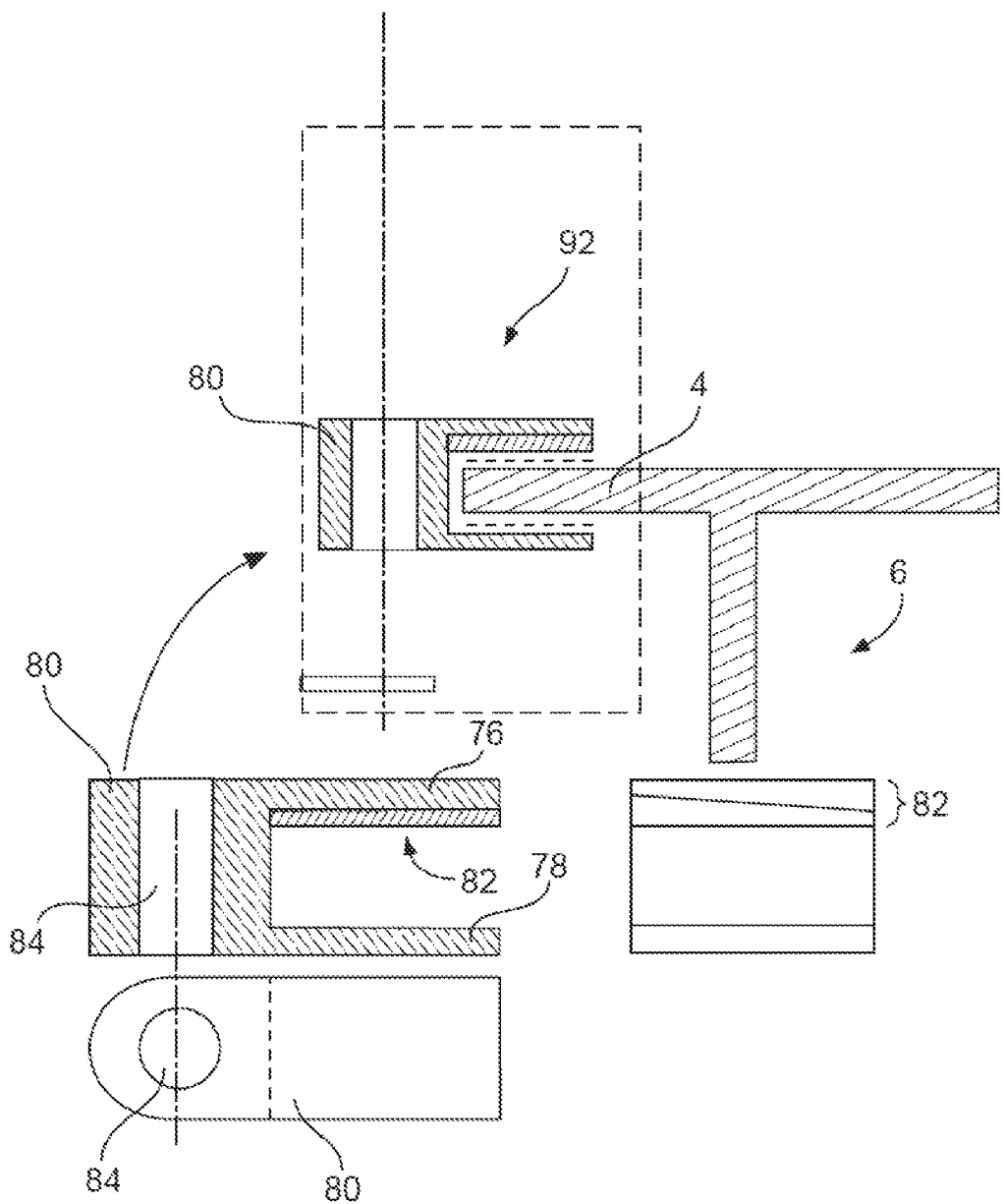
FIG. 13 shows an adhesive holder according to the invention made from an integral milled part in the form of a lateral section.

Furthermore, FIG. 13 shows a variation of the adhesive holder 74 according to the invention according to FIG. 11 in the form of an adhesive holder 92 that is formed by the integral milled part 80 only, wherein this integral milled part comprises a single eye 84 for accommodating object holders 20 or other components.

Figure 14:
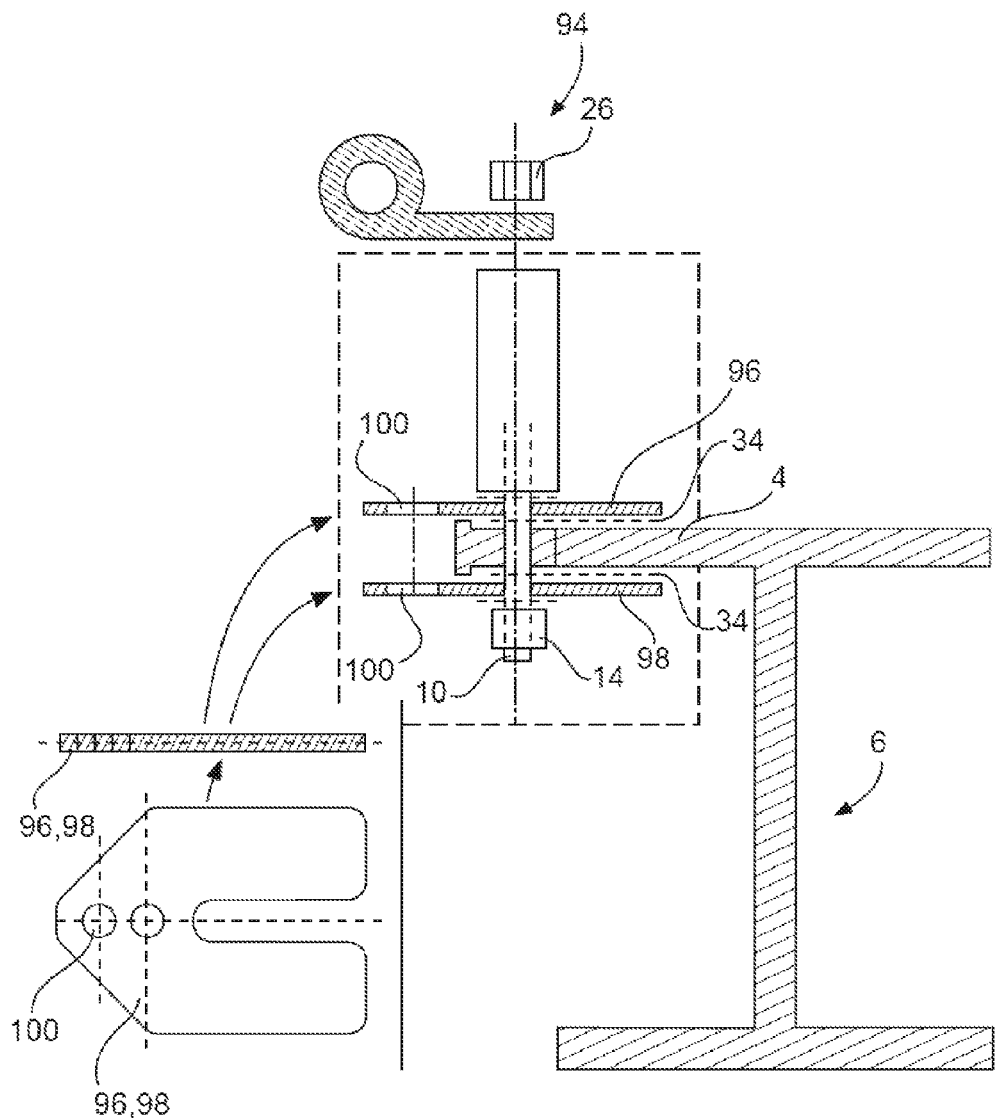
FIG. 14 shows an adhesive holder according to the invention with an elongated adapter and an elongated counter element in the form of a lateral section.

Likewise, FIG. 14 shows a variation of the adhesive holder according to FIG. 9 in the form of an adhesive holder 94, in which an adapter 96 and a counter element 98 extend farther outward from the structural element and comprise a common bore 100 for accommodating object holders 20 or the like.

Figure 15:
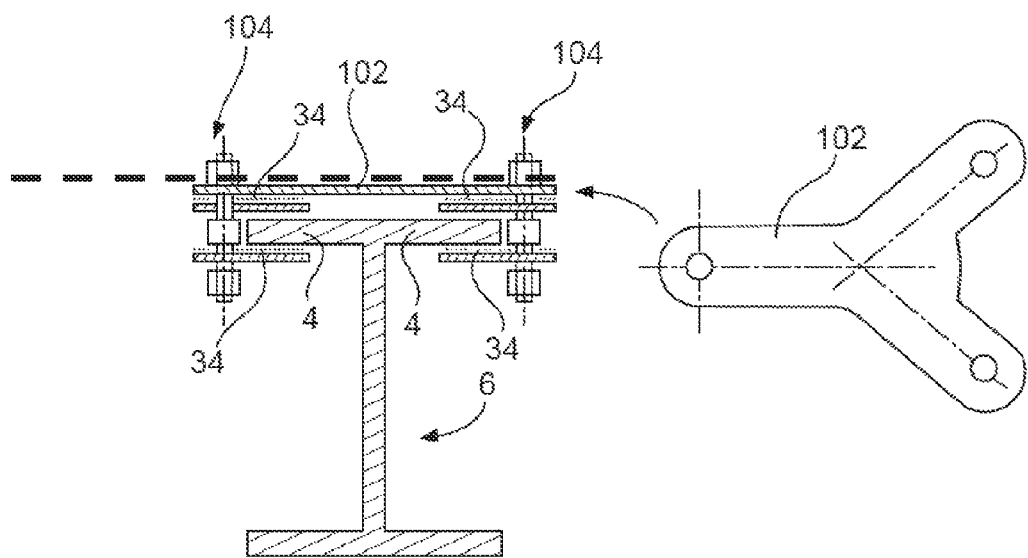
FIG. 15 shows an adhesive holder according to the invention with an adhesive or holding template in the form of a lateral section.

In order to also achieve a positive support in or opposite to a moving direction of the vehicle, it would be possible to bond in a template 102 together with an adhesive holder. Such templates 102 may be made of thin sheet metal and fix the individual adhesive holders during the bonding process. After a curing process, they always distribute loads in or opposite to the moving direction in such a way that they only act upon the structural element in the form of a compressive load. FIG. 15 shows such a template 102 that is connected to several adhesive holders 104.

Figure 16:
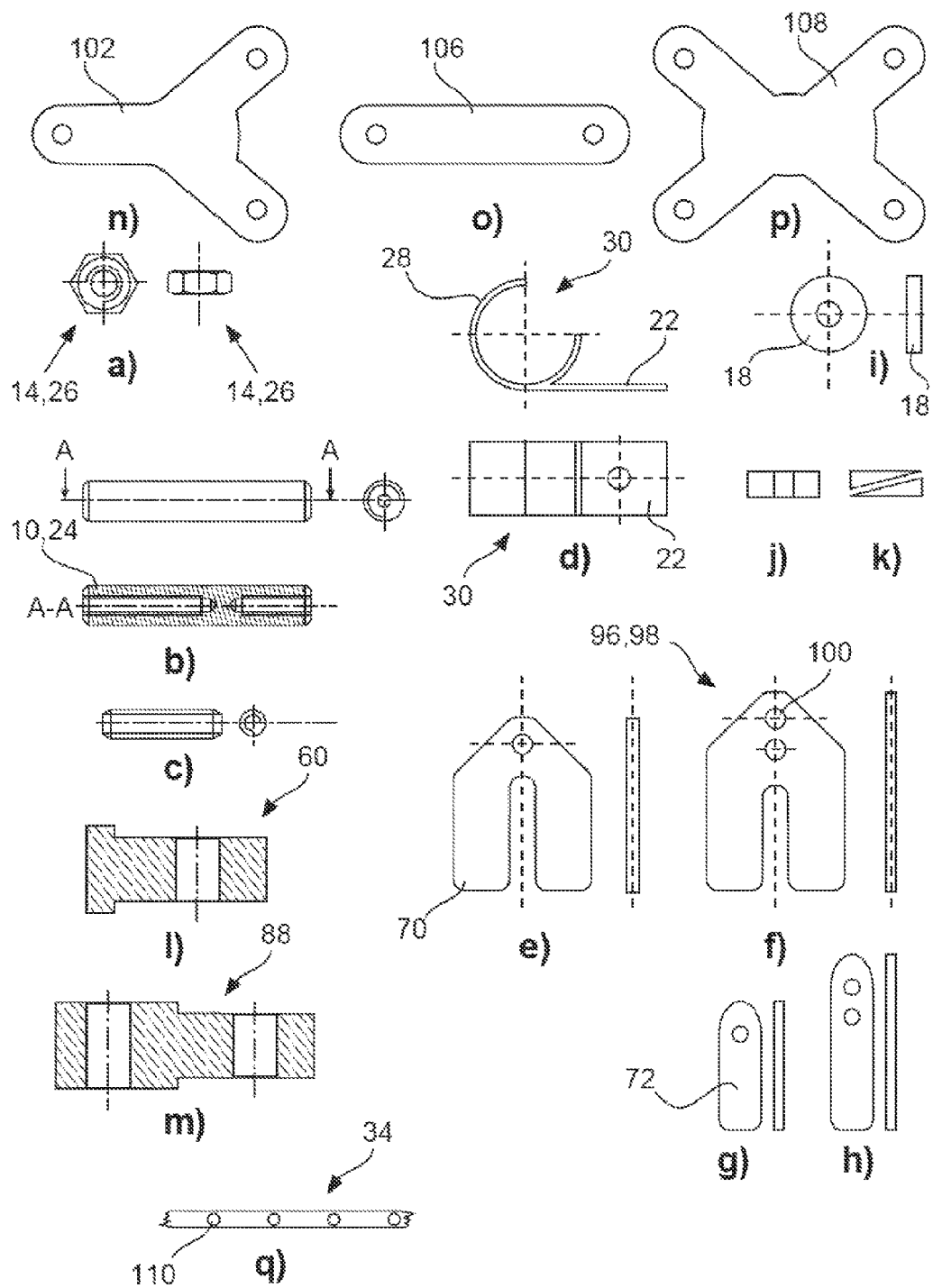
FIGS. 16a) to 16q) show a kit for making an adhesive holder according to the invention.

FIG. 16 shows a kit with several above-described components that may be used for making an adhesive holder according to the invention. This kit comprises:
- adapters with any shapes according to FIGS. 16e) to 16h),
- counter elements with any shapes, namely also according to FIGS. 16e) to 16h),
- intermediate pieces according to FIGS. 16i) to 16m) for defining a spacing between an adapter and a counter element,
- spacers according to FIG. 16b) for positioning object holders in a spaced-apart fashion,
- fastening means according to FIGS. 16a) and 16b) for connecting adapters and counter elements, e.g., threaded elements such as screws, threaded rods and the like, rivet elements, adhesives and other means, in a spaced-apart fashion,
- object holders according to FIG. 16d),
- adhesive layers according to FIG. 16q), wherein the adhesive layers may consist of an adhesive and optional hard particles for absorbing compressive loads and limiting the thickness of the adhesive layer, and
- adhesive or holding templates according to FIGS. 16n) to p), for example, for fixing two, three or four adhesive holders according to the invention.

FIGS. 16o) and p) show templates 106 and 108 that represent variations of the template 102 according to FIG. 16n). Furthermore, FIG. 16q) shows an adhesive layer 34 that comprises an adhesive with embedded glass globules 110.

Figure 17:
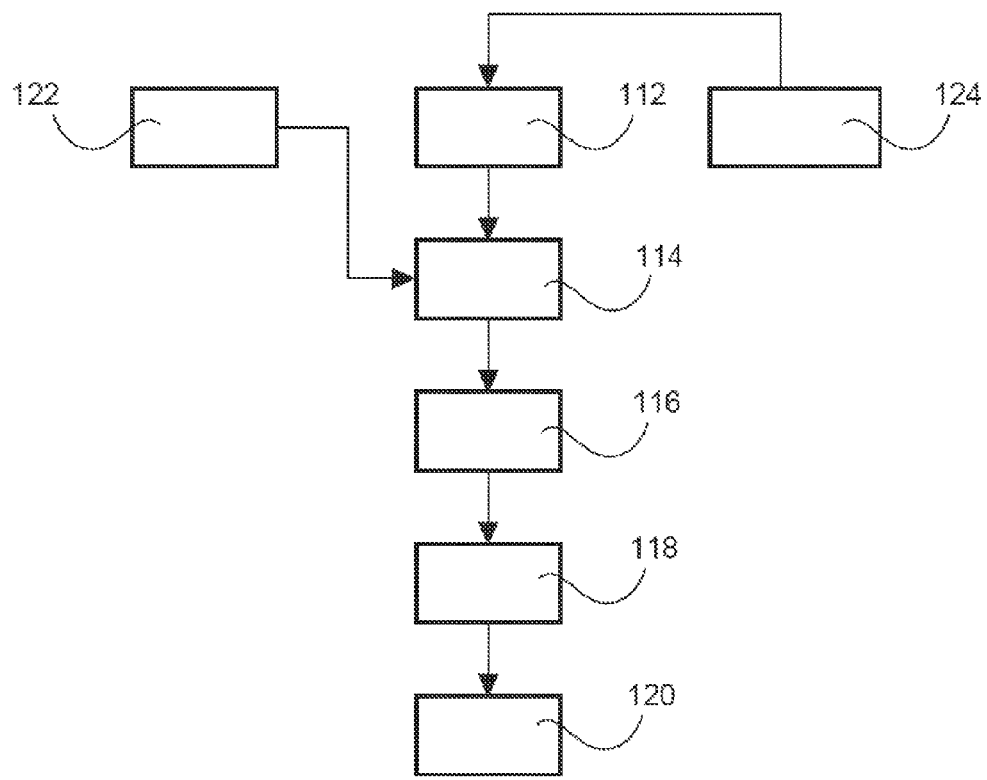
FIG. 17 shows a method for fastening an object on a structure of a vehicle in the form of a schematic block-based illustration.

FIG. 17 ultimately shows a block-based illustration of a method according to the invention that essentially comprises the steps of connecting 112 an adapter and a counter element to a fastening means, of applying 114 an adhesive layer onto the contact surface of the adapter and/or the counter surface of the counter element, of producing 116 a connection with a structural element, of fixing 118 the adapter and the counter element relative to one another and of attaching 120 an object holder. An intermediate piece is optionally inserted 122 between the adapter and the counter element, and the step of connecting 112 the adapter and the counter element optionally comprises the bonding 124 of one or more fastening means in order to fix the adapter and the counter element.

As a supplement, it should be noted that "comprising" does not exclude any other elements or steps, and that "a" or "an" does not exclude a plurality. It should furthermore be noted that characteristics that were described with reference to one of the above exemplary embodiments may also be used in combination with other characteristics of other above-described exemplary embodiments. The reference symbols in the claims should not be interpreted in a restrictive sense.

LIST OF REFERENCE SYMBOLS

2 Adhesive holder
4 Web
6 Structural element
8 Adapter
10 Threaded rod
12 Counter element
14 Counter nut
16 Threaded tube
18 Spacer disc 20 Object holder
22 Lug
24 Threaded rod
26 Counter nut
28 Clamp structure
30 Cutout
32 Insulating packet
34 Adhesive layer
35 Adhesive holder
36 Counter element
38 Adhesive holder
40 Counter element
41 Adhesive holder
42 Peek traverse
43 Adhesive holder
44 Adapter
46 Counter element
48 Web
50 Longitudinal reinforcing component (stringer, structural element)
52 Adapter
54 Counter element
56 Intermediate piece
58 Adhesive holder
60 Spacer
62 Adapter
64 Counter element
65 Adhesive
66 Shoulder
68 Adhesive holder
70 Adapter
72 Counter element
74 Adhesive holder
76 Adapter
78 Counter element
80 Integral milled part
82 Wedge combination
84 Eye
86 Adhesive holder
88 Spacer
90 Eye
92 Adhesive holder
94 Adhesive holder
96 Adapter
100 Counter element
100 Bore
102 Template
104 Adhesive holder
106 Template
108 Template
110 Glass globules
112 Connecting
114 Applying an adhesive layer
116 Connecting to a structural element
118 Fixing adapter and counter element
120 Attaching an object holder
122 Inserting an intermediate piece
124 Bonding

The invention claimed is:

1. A holder for holding objects, comprising:
an adhesive layer;
an object holder;
an adapter with a contact surface;
a counter element with a counter surface; and
a spacer;
wherein the counter surface of the counter element is positionable at a predetermined distance from the contact surface of the adapter via the spacer to enclose a section of a structural element, the spacer configured to maintain the predetermined distance between the adapter and the counter element; and
wherein the adhesive layer contacts at least one of the contact surface of the adapter and the counter surface of the counter element.

2. The holder of claim 1, wherein the adhesive layer comprises an adhesive and hard particles with a diameter that defines the thickness of the adhesive layer.

3. The holder of claim 1, wherein the adapter and the counter element comprise planar configuration and are arranged parallel to one another at the predetermined distance from one another to insert plane surfaces of a structural element therebetween.

4. The holder of claim 1, further comprising a plurality of adhesive layers in order to enlarge the adhesive surface.

5. The holder of claim 1, wherein the adapter and the counter element are shaped differently such that the counter surface of the counter element covers a region of the structural element that is not completely covered by the contact surface of the adapter.

6. The holder of claim 1, furthermore comprising an intermediate piece between the adapter and the counter element in order to create a predetermined spacing between the adapter and the counter element.

7. The holder of claim 6, wherein the intermediate piece comprising an eye for accommodating additional components on an opposite end referred to the adapter and the counter element.

8. The holder of claim 6, wherein the intermediate piece is composed of two or more intermediate piece sections that result in a desired thickness of the intermediate piece when they are variably arranged relative to one another.

9. The holder of claim 6, wherein the intermediate piece sections are realized in a wedge-shaped fashion and is positionable offset relative to one another in order to adjust a predetermined spacing between the stressed surface of the structural element and the contact surface or the stressed surface of the structural element and the counter surface.

10. The holder of claim 1, wherein the adapter and the counter element comprise fastening devices that are adapted for fixing the adapter and the counter element relative to one another.

11. The holder of claim 1, wherein the adapter and the counter element are realized in the form of spaced-apart lugs of an integral component.

12. The holder of claim 11, wherein the integral component comprises and eye for accommodating other components on an opposite end referred to the adapter and the counter element.

13. A kit for making an holder of claim 1, comprising one or more components of a group of components, wherein the group comprises:
an adapter with a contact surface;
a counter element with a counter surface;
an adhesive layer;
a spacer;
an object holder;
fastening devices; and
an intermediate piece consisting of one or more intermediate piece sections.

14. The holder of claim 1, wherein at least one of the contact surface and the counter surface includes structures for engaging a surface of a structural element.

15. The holder of claim 1, wherein the structure for engaging the surface of a structural element is selected from the group consisting of teeth, serrations, knurling and texturing.

16. The holder of claim 1, further comprising a threaded rod connecting the adapter and the counter element to one another, wherein the threaded rod passes through the spacer.

17. The holder of claim 1, further comprising:
- a threaded hollow tube extending between the adapter and the object holder; and
- a threaded rod for coupling the object holder to the hollow tube.

* * * * *